United States Patent [19]
Smith et al.

[11] Patent Number: 6,123,110
[45] Date of Patent: Sep. 26, 2000

[54] DUAL CONTAINMENT PIPE SYSTEM AND A MANHOLE SYSTEM

[75] Inventors: Stainton Casey Smith, Germantown, Tenn.; Randall J. Mach, Franklin Square, N.Y.

[73] Assignee: Insituform (Netherlands) B.V., Netherlands

[21] Appl. No.: 09/390,606

[22] Filed: Sep. 3, 1999

Related U.S. Application Data

[62] Division of application No. 08/500,645, Jul. 11, 1995.

[51] Int. Cl.[7] .................................................. F16L 55/16
[52] U.S. Cl. ............................... 138/98; 138/89; 138/114; 138/113
[58] Field of Search .............................. 138/89, 114, 113, 138/112, 98

[56] References Cited

U.S. PATENT DOCUMENTS

| | | | |
|---|---|---|---|
| 813,918 | 2/1906 | Schmitz | 138/114 X |
| 1,609,818 | 12/1926 | Heydon | 138/98 X |
| 2,440,245 | 4/1948 | Chevigny | 138/114 X |
| 3,655,224 | 4/1972 | Carberry et al. | 138/104 |
| 3,882,382 | 5/1975 | Johnson | 138/104 |
| 4,350,548 | 9/1982 | Zenbayashi et al. | 138/98 |
| 4,410,013 | 10/1983 | Sasaki et al. | 138/114 X |
| 4,421,698 | 12/1983 | Vanderlans | 138/98 |
| 4,508,129 | 4/1985 | Brown | 138/98 X |
| 4,554,650 | 11/1985 | Brown et al. | 138/104 |
| 4,581,801 | 4/1986 | Kobuck et al. | 138/98 X |
| 4,615,359 | 10/1986 | Affa et al. | 138/114 X |
| 4,646,787 | 3/1987 | Rush et al. | 138/98 |
| 4,681,783 | 7/1987 | Hyodo et al. | 138/98 |
| 4,691,740 | 9/1987 | Svetlik et al. | 138/97 |
| 4,752,511 | 6/1988 | Driver | 138/98 |
| 4,770,562 | 9/1988 | Müller et al. | 138/97 |
| 4,836,715 | 6/1989 | Wood | 138/98 |
| 4,848,408 | 7/1989 | Foetmann et al. | 138/104 |
| 4,867,203 | 9/1989 | Jan de Putter | 138/98 |
| 4,877,665 | 10/1989 | Higuchi et al. | 138/98 X |
| 5,010,440 | 4/1991 | Endo et al. | 138/97 |
| 5,052,445 | 10/1991 | Berchem | 138/98 X |
| 5,101,863 | 4/1992 | Fuji et al. | 138/98 |
| 5,127,441 | 7/1992 | Rains | 138/104 |
| 5,167,258 | 12/1992 | Rice | 138/98 |
| 5,172,730 | 12/1992 | Driver | 138/104 |
| 5,305,798 | 4/1994 | Driver | 138/98 |
| 5,343,738 | 9/1994 | Skaggs | 138/114 X |
| 5,395,472 | 3/1995 | Mandich | 138/114 X |
| 5,433,252 | 7/1995 | Wolf et al. | 138/114 X |
| 5,546,992 | 8/1996 | Chick et al. | 138/98 |
| 5,580,406 | 12/1996 | O'ffill | 138/98 X |
| 5,743,299 | 4/1998 | Chick et al. | 138/98 |
| 5,778,938 | 7/1998 | Chick et al. | 138/98 |

FOREIGN PATENT DOCUMENTS

| 53-9878 | 1/1978 | Japan | 156/294 |
|---|---|---|---|

OTHER PUBLICATIONS

TroLining–System Brochure and English translation.

*Primary Examiner*—Patrick Brinson
*Attorney, Agent, or Firm*—Cowan, Liebowitz & Latman, P.C.; Michael I. Wolfson; Lloyd G. Buchanan

[57] ABSTRACT

A dual containment pipe system suitable for installation into an existing conduit includes a new secondary containment pipe with a plurality of substantially uniform internal studs and a new primary containment pipe up against the studs. An annular space is formed between the pipes by the studs which provides space along the length of the conduit for installation of leak detection systems including cables or perforated conduits for removing liquids or purging the annulus. The impervious new primary containment pipe may be cured in place, folded and formed, diameter reduced pipe, or any other pipe suitable for pipeline rehabilitation. A manhole system for connection of service laterals to the main line pipe which maintaining dual containment utilizing closure pieces for the main line coupled to a bellow fitting and service lateral riser tee is also disclosed.

13 Claims, 7 Drawing Sheets

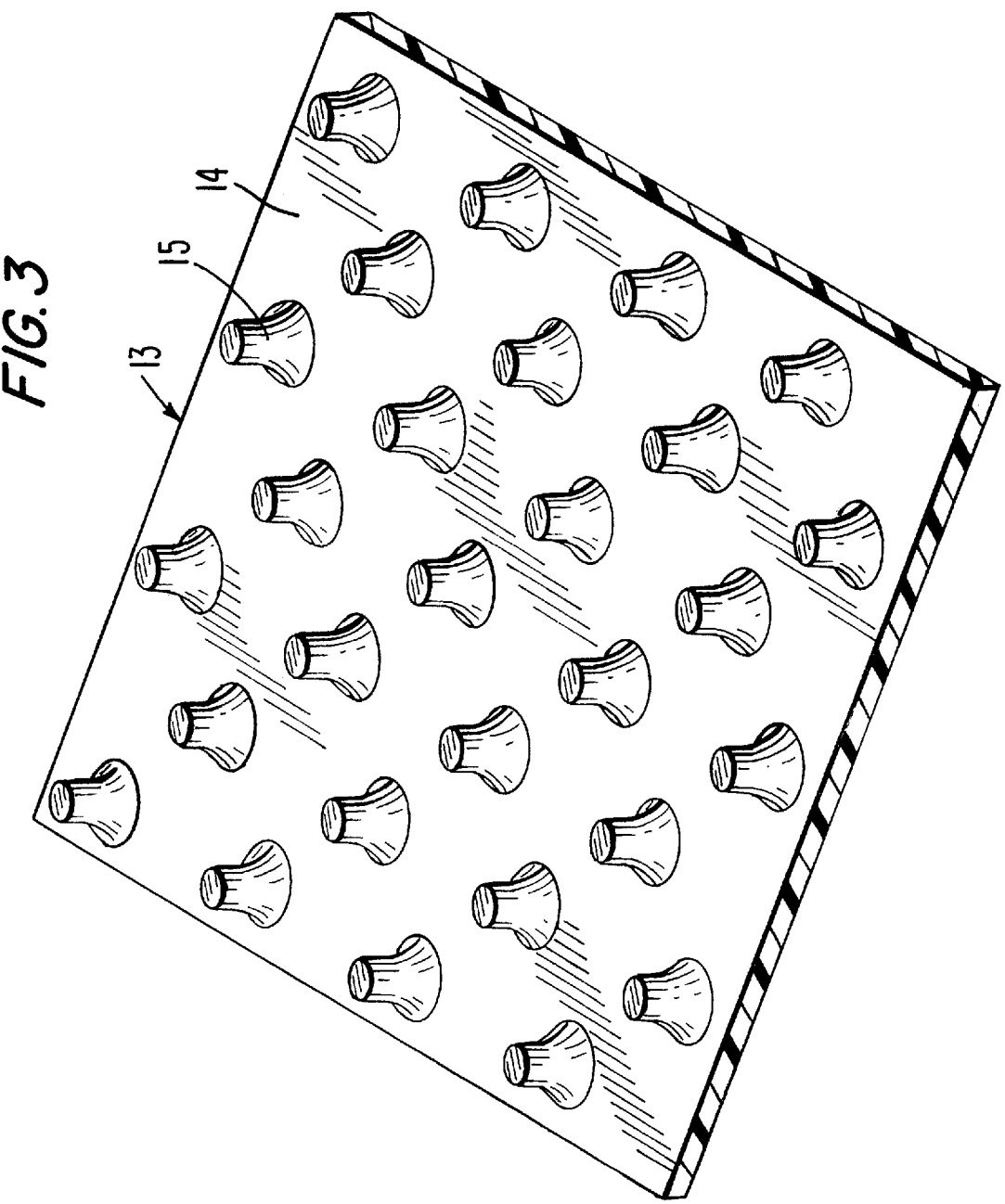

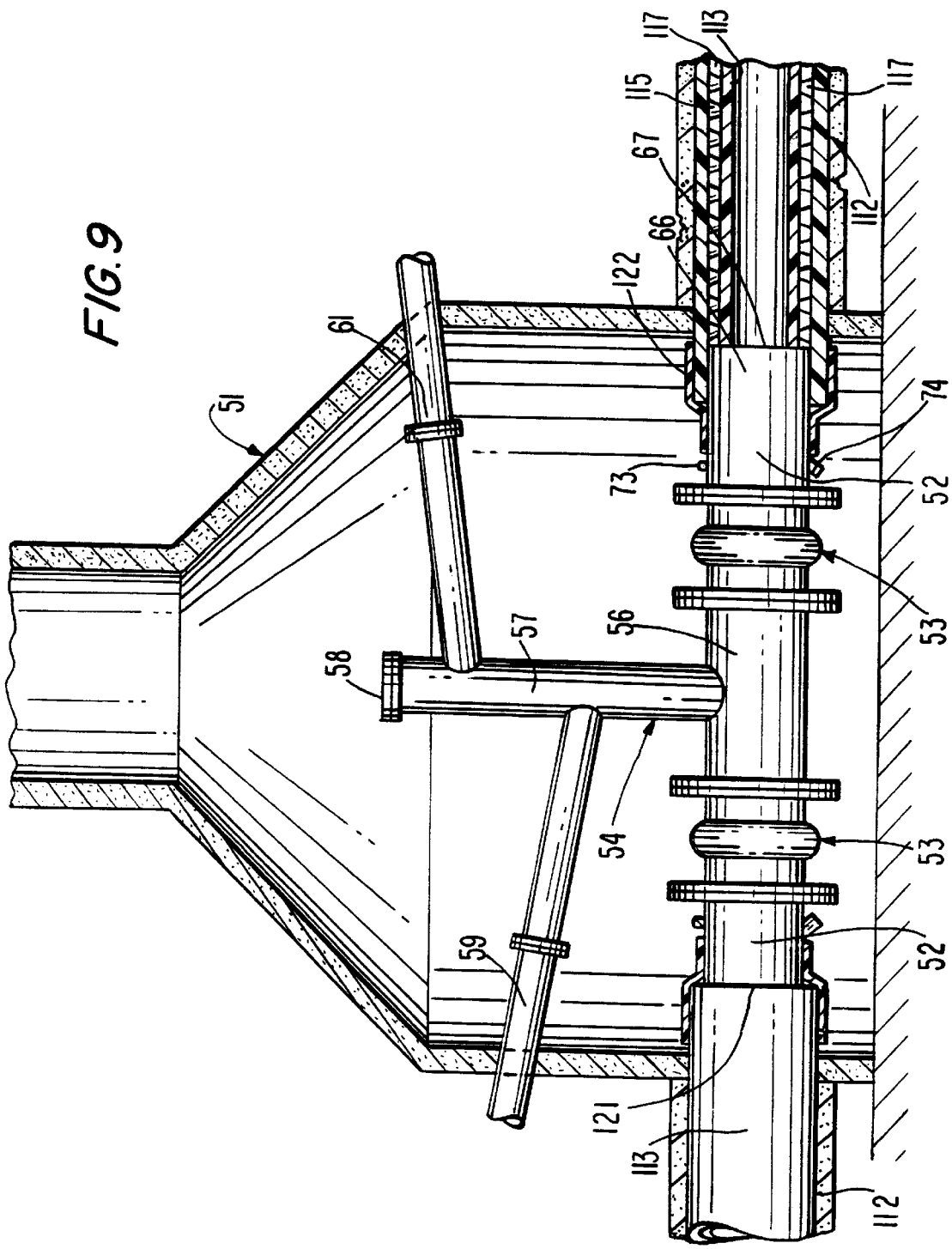

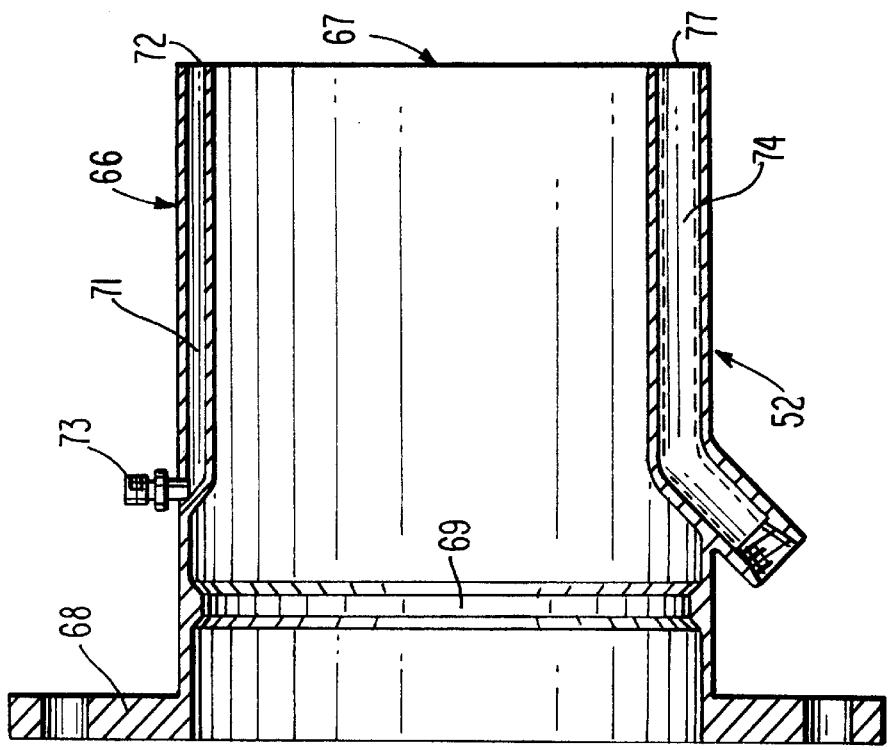
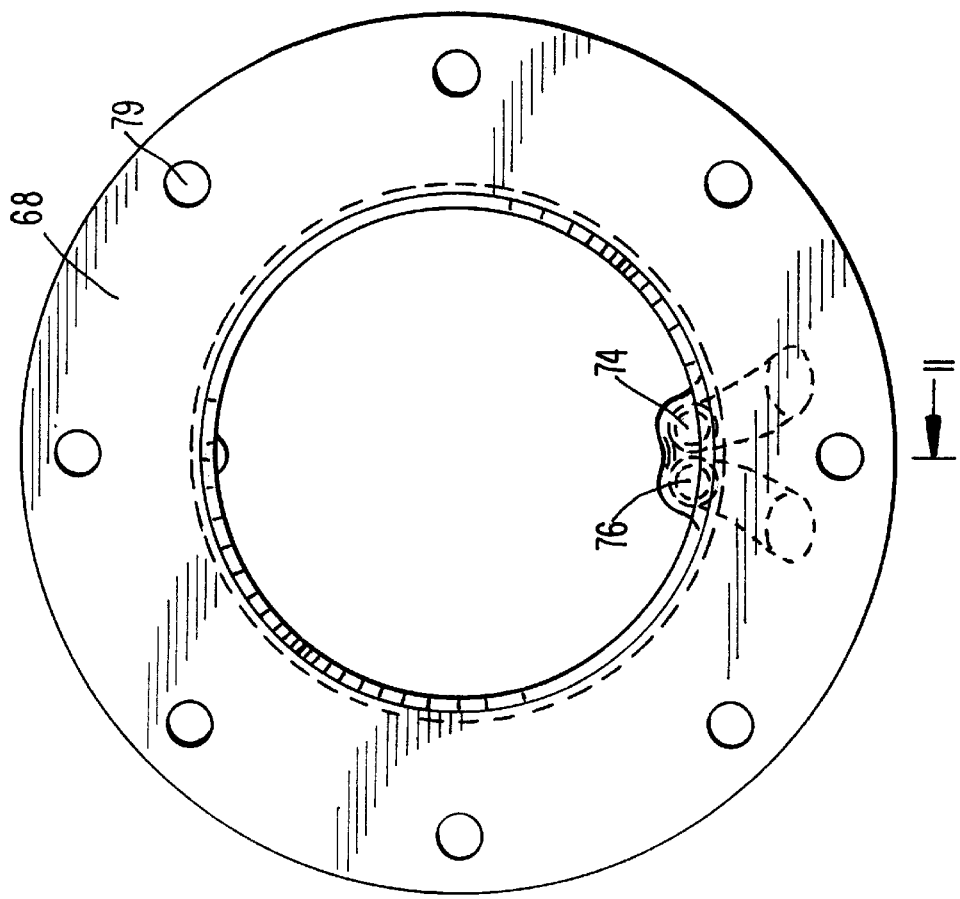

DUAL CONTAINMENT PIPE SYSTEM AND A MANHOLE SYSTEM

CROSS-REFERENCE TO RELATED APPLICATIONS

This application is a divisional of application Ser. No. 08/500,645, filed on Jul. 11, 1995.

BACKGROUND OF THE INVENTION

This invention relates to a dual containment pipe system for installation within an existing conduit, and more particularly to a dual containment pipe system with two verifiably non-leaking barrier/pipes that are separated uniformly with a minimum annular space while maximizing the cross-sectional area of the primary pipe used to transport the effluent. The newly created annular space is suitable for a leak detection system.

There is continuing need to provide pipes and methods of installation for rehabilitating existing pipelines. Due to the fact that many existing conduits handle hazardous liquids, chemicals and petroleum products, and that such pipelines are often located underground, it is desirable to install leak detection systems to meet new environmental regulations and assure health and safety of present and future generations. In these situations it is preferable to be able to rehabilitate and retrofit existing conduits without having to excavate.

One such two-wall leakage detection system for an existing conduit is disclosed in U.S. Pat. No. 5,172,730 and U.S. Pat. No. 5,305,798, which issued on Dec. 22, 1992 and Apr. 26, 1994, respectively, and is assigned to the assignee herein, the contents of which are incorporated herein by reference. While this existing two-wall pipe and leakage detection system is satisfactory, it utilizes a soft absorbent or felt-type material to form the annular space. It is advantageous in that it is suitable for retrofitting relatively long lengths of existing pipe.

An alternative construction of a pipeline monitoring leak containment system is illustrated in U.S. Pat. No. 5,072,622 issued on Dec. 17, 1991 to Roach et al. The pipe system disclosed by Roach et al. includes a pipe having an exterior wall in tight engagement with the interior wall of the carrier pipe with at least one groove located in the exterior surface of the containment pipe. The groove and the interior wall of the outer carrier pipe define at least one passageway. While it is believed that this system is suitable for relatively short lengths, it is limiting in that the containment pipe need be of the substantially rigid type and tends to be expensive to form such grooves on a wide variety of pipes of different sizes. An advantage of this system is that the space formed in the groove should remain uniform along the length of the groove.

It has been suggested to provide a dual containment system utilizing two separate components of liners and a drainage net therebetween. This system allows the existing conduit to function as the secondary containment pipe, if sound. The drainage net provides longitudinal and circumferential channels for directing any liquid leaks to the six o'clock position where a leak detection cable can be located. This system is considered acceptable for many installations, but does require installation of three elements when the existing conduit needs repair.

A well-known process for rehabilitation of existing conduits generally utilizing a flexible liner to be cured in place is the "Insituform®" method described in U.S. Pat. Nos. 4,009,063 and 4,064,211, the contents of which are incorporated herein by reference. Other flexible rehabilitation systems include Paltem® as described in U.S. Pat. Nos. 4,334,943 and 4,600,615. Another rehabilitation process known as the "NuPipe®" process described in U.S. Pat. Nos. 4,867,921 and 5,255,624, the contents of which are incorporated here by reference. In this latter process a substantially rigid replacement pipe is installed in a flattened and folded shape, heated and expanded to the shape of the original conduit. A further rehabilitation system is diameter reduction as described in U.S. Pat. Nos. 4,923,663 and 5,340,524 and Canadian Patent No. 1,241,262.

In the Insituform® Process, a lining tube may be pulled in or inverted into the existing conduit. When it is everted, the lining tube is provided on its outer side with an impermeable coating or film which after eversion becomes the inner surface of the pipeline providing a smooth flow enhancing surface to the interior of the relined pipeline or passageway. While the Insituform® process is extremely viable for relining long lengths of existing conduits, it would not be suitable to provide grooves on the outer surface of such a liner if a dual containment configuration were desired. A separate body of absorbent material may be provided as in U.S. Pat. No. 5,172,730, identified above.

Accordingly, it is desirable to provide an improved dual containment pipe system which overcomes the short-coming of the prior art identified.

SUMMARY OF THE INVENTION

Generally speaking, in accordance with the invention, a dual containment pipe system provides for dual containment of an existing conduit in an illustrated embodiment the conduit is an industrial sewer with services reinstated at the manhole. This isolates and dual contains the effluent from its original environment in the host pipe and in the manhole.

The dual containment system includes a new secondary containment pipe formed from an extruded sheet of thermoplastic material with a plurality of studs on one surface which has been formed into a tubular shape with the studs on the inside. The tubular shape performs both separation and barrier functions and is installed into an existing conduit and conforms to the interior configuration thereof. A new impervious primary containment pipe is installed inside the studded secondary pipe so that a uniform annular space is formed between the pipes Alternatively, the studded thermoplastic sheet in tubular form can be placed around the primary conduit pipe and inserted into the existing conduit together.

The new studded thermoplastic secondary pipe is formed with a large number of studs regularly spaced on one surface. The studs are regularly positioned in a diagonally offset pattern on the sheet and may be present from about 200 to 5000 studs per square meter and are between 2.0 and 25 mm in height, preferably between 2.0 and 10 mm. The sheet may be formed of a wide variety of thermoplastic materials, such as high density polyethylene, polypropylene, polyvinylidene fluoride, ethylene chloro tetrafluoro ethylene, and the like. A leak detection system may be installed in the space between the pipes. The primary containment pipe may be any one of the various types of liners used to rehabilitate existing pipelines without excavation. Such liners may be of the cured in place flexible type, which includes a fibrous carrier with at least one impervious membrane on the surface facing the studs. The carrier is impregnated with thermosetting resin mixed with catalyst and promoter and after inflation by internal pressure is cured in place. Alternatively, the primary containment pipe may be of a substantially rigid folded pipe which is inserted into an existing conduit in a reduced configuration and after rounding by application of heat and internal pressure is cooled to conform to the internal configuration of the existing conduit, a thermoplastic liner of the diameter reduction type, or any other acceptable rehabilitation system. The flexible type liners may be pulled into place or everted and the substantially rigid liners are pulled into place. Accordingly, it is an object of the invention to provide an improved dual containment pipe system for installation in existing conduits.

Another object of the invention is to provide a method of installation of a dual containment pipe system in an existing conduit.

A further object of the invention is to provide a dual containment pipe system having a substantially uniform annular space along the full length of the pipe system.

Still a further object of the invention is to provide a closure piece for a dual containment system to allow for leak detection and/or purging the system should a leak develop.

Yet another object of the invention is to provide a manhole system for isolation of primary containment from the secondary system, using a closure piece, bellow fittings and service lateral riser tee for coupling the primary containment pipe in the manhole.

Still another object of the invention is to maximize the fluid carrying capacity of the existing fluid carrying pipe while providing the benefits of a dual contained system.

Still other objects and advantages of the invention will in part be obvious and all or part be apparent from the specification.

The invention accordingly comprises the several steps and the relation of one or more of such steps with respect to each of the others, and the pipe systems embodying features of construction, combinations of elements and the arrangement of parts which are adapted to affect such steps and constructions, all exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 3 is a perspective view of a section of a studded thermoplastic sheet which is utilized in the forming the new secondary containment pipe in the dual containment system in accordance with the invention;

FIG. 9 is a cross-sectional view of a manhole configuration in accordance with the invention showing a closure piece at the inlet to each conduit, bellow fittings and service lateral connections;

FIG. 10 is a side elevational view of the flange end of the closure piece utilized in the manhole configuration of FIG. 9; and FIG. 11 is a cross-sectional view of a closure piece taken along line 10—10 in FIG. 10.

DESCRIPTION OF THE PREFERRED EMBODIMENTS

A dual containment pipeline system constructed and arranged in accordance with the invention when installed in an existing conduit includes a secondary containment pipe with a plurality of substantially uniform internal studs and a new primary containment pipe up against the studs. After installation of the primary pipe the studs create a uniform annular space between the pipes and a longitudinal channel which is particularly well-suited for placement of a leakage detection system. The dual containment pipe permits maximum flow through the existing conduit, is non-destructive and can be installed without excavation thereby avoiding the need to dispose of potentially contaminated excavation.

The primary containment pipe may be a flexible cured in place pipe, a folded and formed substantially rigid pipe, a diameter reduction pipe, or any other acceptable rehabilitation system. In case the host pipe is not sound, the original conduit may be repaired prior to installation of the dual containment system with a cured in place pipe, a folded and formed pipe or a diameter reduction pipe, or any other acceptable rehabilitation process.

A studded secondary containment pipe utilized in accordance with the preferred embodiment of the invention is formed from a thermoplastic sheet having a plurality of substantially uniformly sized and spaced knobs or studs on one surface. The sheet is formed into a tube and joined with the studs facing inwardly. The secondary pipe is installed in the existing conduit and the new primary containment pipe is installed inside the secondary pipe up against the studs. The space between the pipes is particularly well-suited to permit installation of a leak detection system along the length of the conduit lined with the dual containment system. The studded secondary containment pipe also permits use of a cured in place, folded and formed, diameter reduction, or any other acceptable rehabilitation process is the primary containment pipe in the dual containment system. When cured in place liners are utilized in the dual containment system as the new primary containment system, both sides of the resin impregnated material include an impermeable layer so that the new primary pipe can be installed up against the studs and will not fill in the space between the studs. Thus, the liner may be everted into place as described in U.S. Pat. No. 4,064,211 and described in connection with FIG. 4, or pulled into place and expanded by an everting bladder which may be removable after curing as described in U.S. Pat. No. 4,786,345. The separate elements of the dual containment system may be installed in a variety of ways well known in the art.

Figure 1:
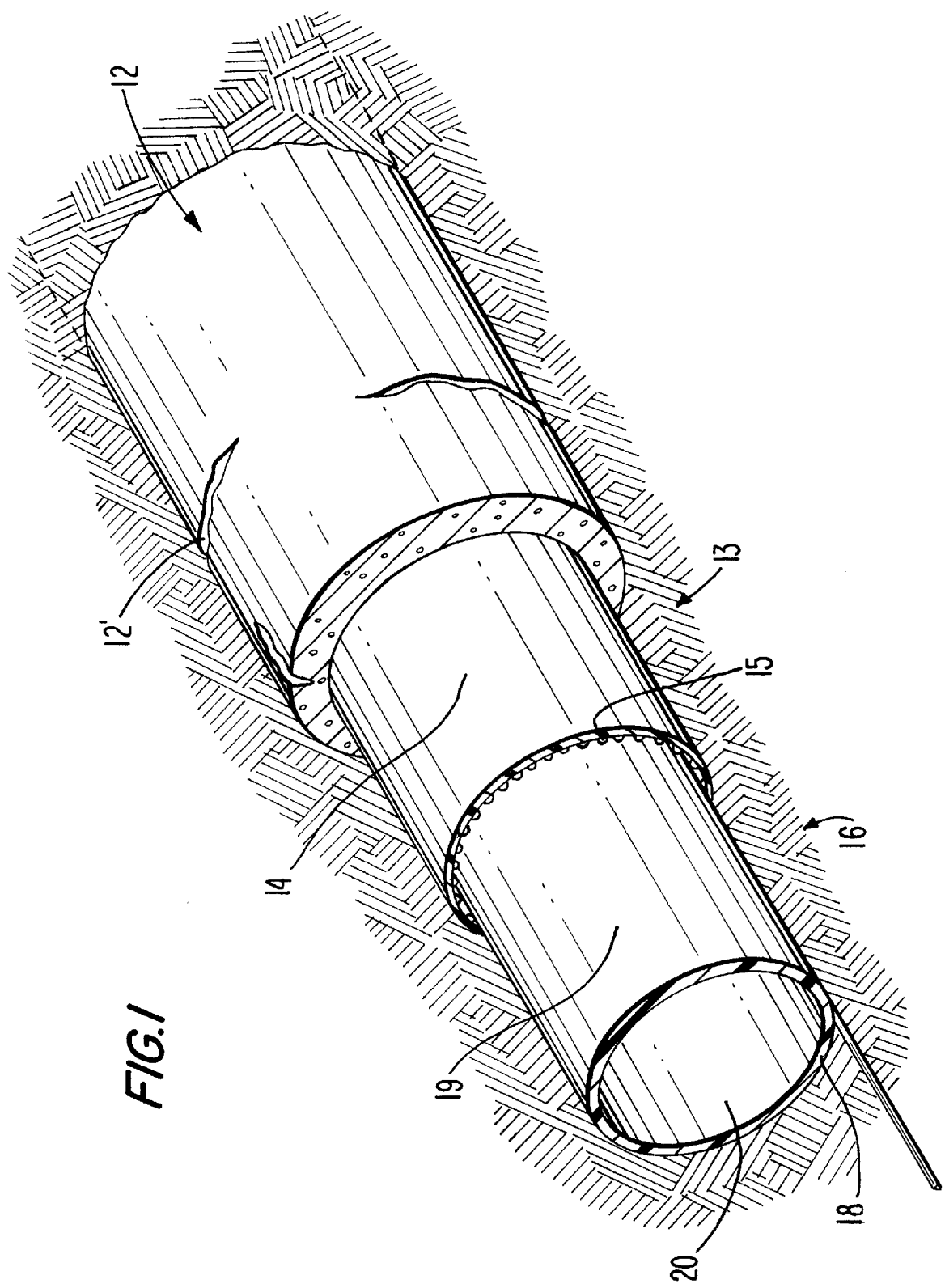
FIG. 1 is a perspective view of a dual containment pipe system constructed and arranged in accordance with an embodiment of the invention.

FIG. 1 illustrates a dual containment pipe system, illustrated generally as 11, in accordance with the invention which has been installed in an existing conduit 12 which has been found to be in need of repair due to the presence of cracks 12'. Dual containment pipe system 11 includes a new internally studded secondary containment pipe 13 formed of thermoplastic sheet 14 with a plurality of internal studs 15 and a new primary containment pipe 16 installed up against studs 15. A uniform annular space 17 is created between sheet 14 of secondary containment pipe 13 and new primary containment pipe 16. This is shown in cross-section in FIG. 2.

Figure 2:
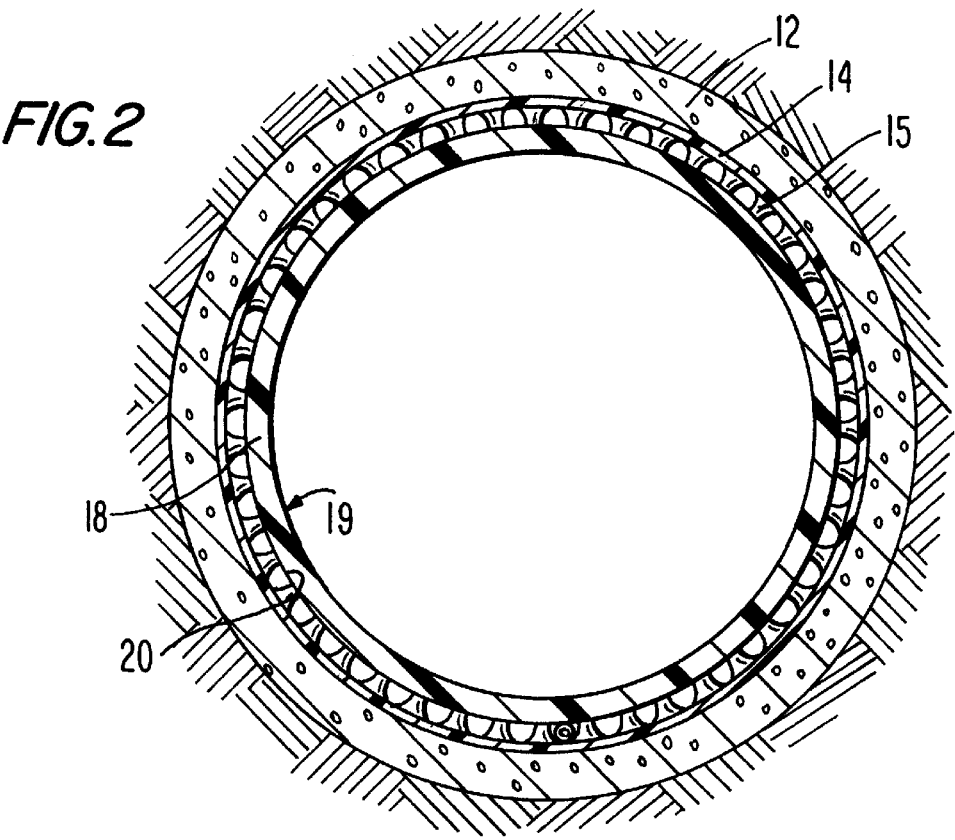
FIG. 2 is a cross-sectional view of the dual containment system illustrated in FIG. 1.
Figure 8:
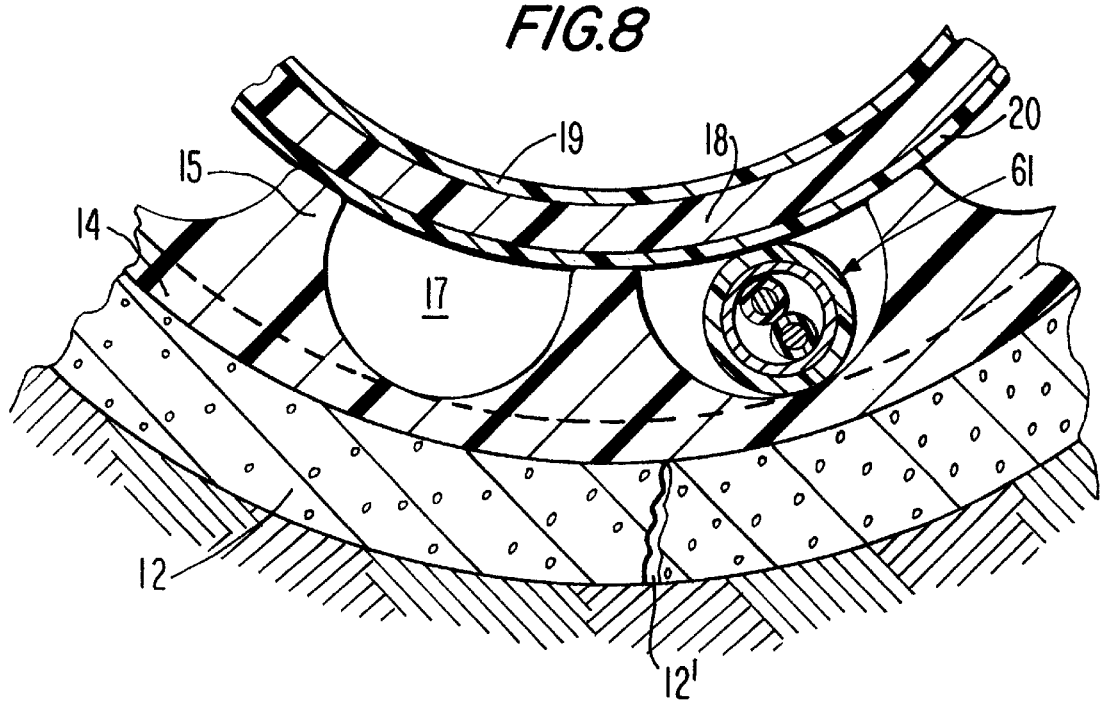
FIG. 8 is a cross-sectional view of the dual containment lined system of FIG. 7 taken along line 8—8.

Referring to FIGS. 1 and 2, new primary containment pipe 16 may be any of a variety of containment pipes conventionally used for relining or rehabilitating conduits without excavating. When pipe 16 is a cured in place flexible liner, such as Insituform®, a tube formed of a felt or other resin absorbing material 18 as is well known in the art maybe provided on its outer side with a impermeable coating 19 which after eversion becomes the inner surface of primary containment pipe 16. An impervious membrane 20 is also provided on the outer surface of installed primary pipe 16 against studs 15. This prevents resin impregnated into resin absorbing material 18 of pipe 16 from migrating into and filling annular space 17. Impermeable membrane 19 provides a smooth inner surface for new primary containment tube 16.

The details of thermoplastic sheet 14 having a plurality of studs 15 in accordance with a preferred embodiment of the invention is shown in detail in FIG. 3. Sheet 14 is formed from an extruded thermoplastic material and a plurality of substantially uniform knobs or studs 15 formed during extrusion and which are regularly spaced across one side of sheet 14. Sheet 14 is provided in a length comparable to the length of the pipeline or conduit to be lined with the dual containment system in accordance with the invention and is turned into a tube with studs 15 facing inwardly. Preferably, studs 15 are diagonally staggered on the entire liner surface. A large number of studs 15 is provided, such as 420 per square meter, although this can vary depending on the diameter of the system from about 200 to 5000 per square meter. Studs 15 are of substantially uniform shape with a height of about 3.5 mm, but can vary from 2.0 to 25.0 mm, if desired. Sheet 14 is then joined by any convenient means, such as bonding or thermal welding with studs 15 facing inwardly to form secondary pipe 13. In accordance with another embodiment illustrated in FIG. 6, a new folded and formed primary containment pipe 43 is shown disposed within a secondary pipe 41 with studs 42. Secondary pipe 41 is formed in the same manner as pipe 13 with a plurality of studs 42 on the inner surface as in FIG. 2.

Figure 7:
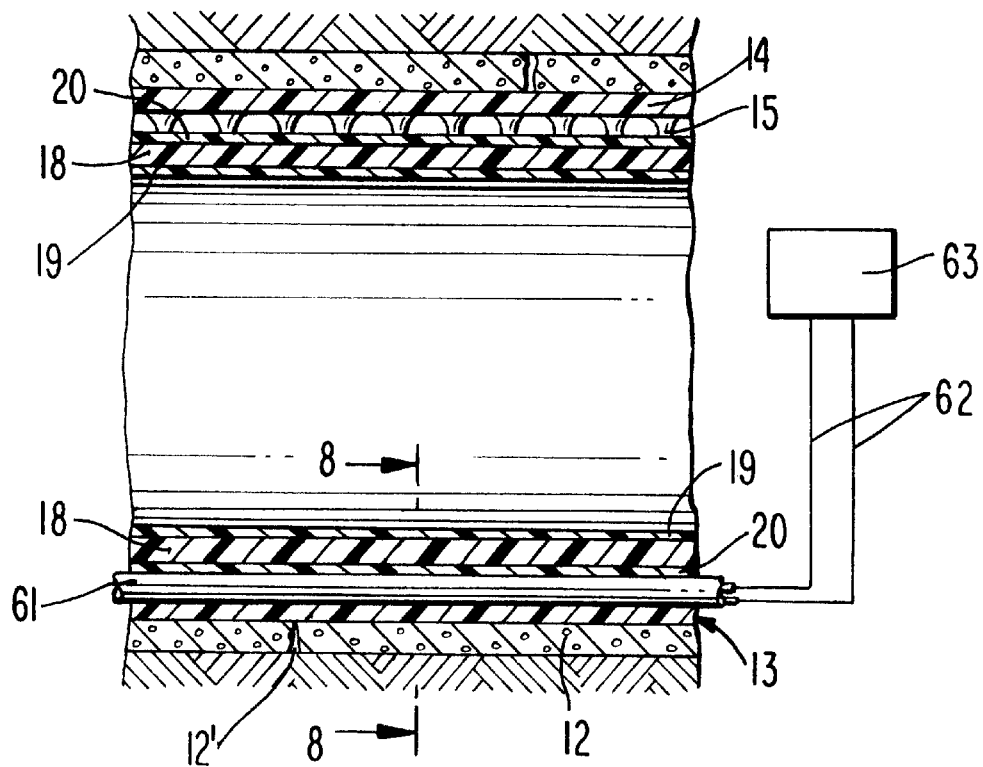
FIG. 7 is a cross-sectional view along the length of a conduit in which the dual containment pipe system in accordance with the invention has been installed together with a leakage detection system.

Referring now to FIG. 3, studs 15 are uniformly spaced apart on sheet 14 in a diagonally staggered pattern to create spaces between studs 15 in regular patterns. The space between studs 15 is particularly well-suited for receipt of an elongated sensing element for detecting leaks in the form of a cable which is positioned along the length of the conduit where the presence of fluid can be detected. The cable is electrically connected to an external control and indicating system which informs an operator of the existence and location of leaks. Installation of such a leakage detection system is shown in FIG. 7 which will be described in more detail below. The annular space between the pipes in the system also allows for draining water or other fluids out of the annulus, or allows warmed nitrogen to be pumped in to purge the system of condensate.

Figure 4:
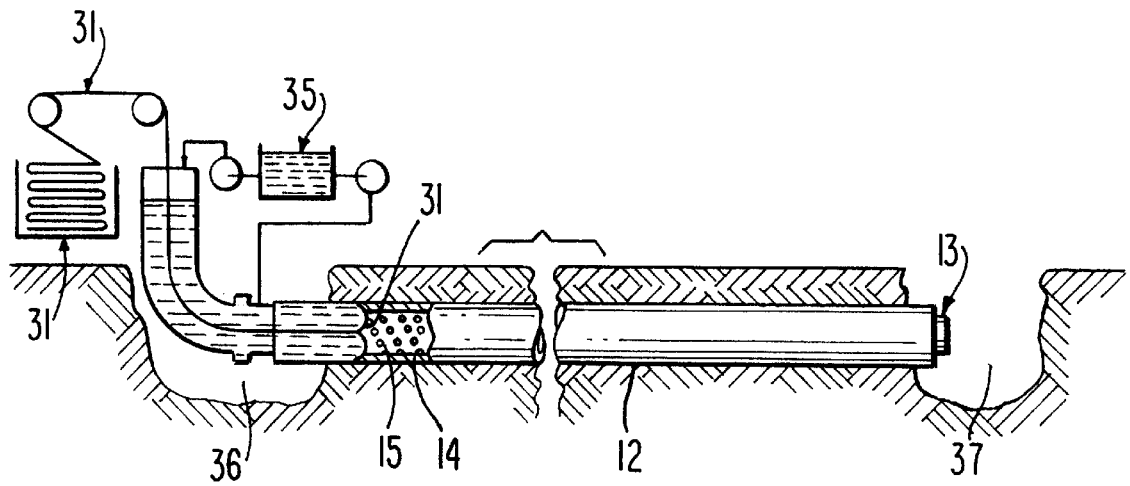
FIG. 4 is a perspective view illustrating installing a resin impregnated flexible cured in place liner to serve as the new primary containment pipe inside the studded secondary pipe in accordance with the invention, the installation of the primary containment pipe being done by eversion.

When existing conduit 12 is not sound, it may first be repaired by use of any one of the accepted rehabilitation methods, such as a cured in place flexible liner 31 as shown in FIG. 4. Liner 31 is the type disclosed in U.S. Pat. Nos. 4,009,063 and 4,064,211. Liner 31 may be pulled into place or everted, and radial pressure is applied to the interior of liner 31 to press it outwardly into engagement with the inner surface of existing conduit 12.

The method of installation in FIG. 4, can also be used to install primary containment pipe 16 of FIG. 1. A cured in place liner 31 is supplied in a folded condition and is fed through a supply pipe 34 into existing conduit 12 which has been previously lined with new secondary pipe 13 with studs 15. Supply pipe 34 is filled with water by a pump 35 to force resin impregnated liner 31 out of the lower end of supply pipe 34 into existing conduit 12, turning it inside out from an upstream manhole 36 to a downstream manhole 37. After curing the resin by any known means, such as by application of heat, various forms of radiation, ultrasonics or other means, flexible liner 31 becomes the new primary containment pipe 16 illustrated in FIGS. 1 and 2. Multiple inflation liners may also be used as described in U.S. Pat. No. 5,407,630, assigned to the assignee herein and incorporated by reference.

Figure 6:
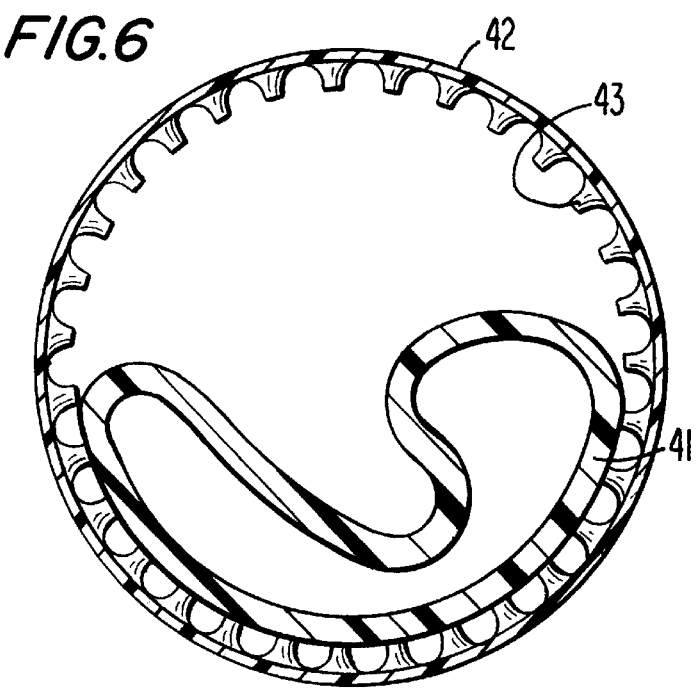
FIG. 6 is a cross-section view of a formed and folded primary containment pipe being installed inside the studded secondary containment pipe in accordance with the invention.
Figure 5:
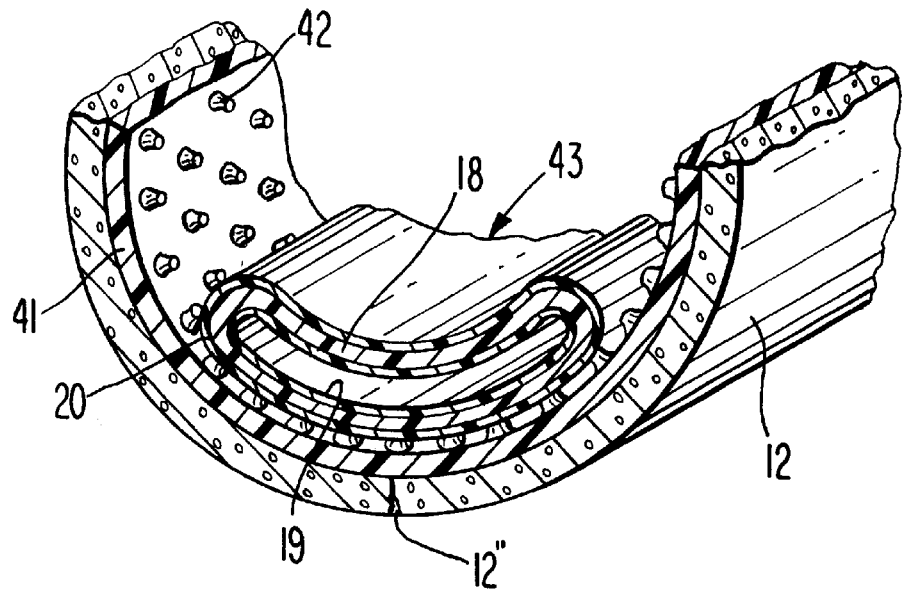
FIG. 5 is a partial sectional view illustrating installation of a cured in place primary containment tube disposed within the studded secondary containment pipe being pulled into the conduit in accordance with the invention.

Alternatively, FIG. 6 illustrates a new primary containment pipe 41 of the rigid folded and formed pipe of the type illustrated in U.S. Pat. No. 4,867,921. Primary pipe 41 is shown after it has been pulled into a secondary pipe 42 with studs 43. The new primary pipe may also be of the diameter reduction type, or any other acceptable rehabilitation pipe.

Dual containment pipe system 11 of FIG. 1 including new cured in place primary containment pipe 16 and secondary pipe 13 may be pulled into a host conduit which has been repaired with a new containment pipe of the cured in place, folded and formed or diameter reduction type. Secondary pipe 13 and new primary containment pipe 16 of the dual containment system are pulled into conduit 12 by a rope coupled to a downstream winch. After primary containment pipe 16 and secondary pipe 13 are in place, fluid or an inflation bladder is fed into the inside of pipe 16 to force it against studs 15 so that dual containment system 11 in accordance with the invention takes up the interior configuration of original conduit 12 as in the case of installation of new primary containment pipe 16 described in connection with FIG. 4.

When new primary containment pipe 16 is a cured in place flexible liner impregnated with resin, the resin is cured by any suitable means, such as by hot water, by light radiation, ultrasonics or other means. Once the resin is cured, a rigid pipe lining having substantially the flow capacity of the original conduit 12 is formed. Uniform annular space 17 determined by the dimension of studs 15 of sheet 14 is formed. The space between studs may then be utilized for the leak detection system. New primary containment pipe 16 may also be rounded utilizing a second inflation tube which may be subsequently stripped out, or if impregnated with a curable resin can be everted with the external felt liner as described in U.S. Pat. No. 5,407,630.

FIG. 7 illustrates a fluid detection system installed in a dual containment system in accordance with the invention. A leak detection system cable 61 is placed in annular space 17 at the six o'clock position in space 17 between studs 15 along the entire length of conduit 12 and is connected by means of wires 62 to an external control and indicating station 64. Dual containment system 11 include new secondary containment pipe 13 as illustrated in FIGS. 1 and 2. Drainage of water or any liquids accommodating in annular space 17 can be purged as will be discussed below in connection with the closure piece and manhole configuration.

Leak detection maybe accomplished by several methods, such as by installation of an elongated leak detection cable system described above. Alternatively, both ends of the uniform annular space maybe sealed and either a pressure or vacuum is placed on said space, so that when a leak occurs, a change in pressure is detected. In another detection system, the upstream end of the uniform annular space may be sealed, and an opening at the downstream exit allows observation of any leaks between the upstream end and the downstream exit. In some of these methods, the detection system indicates the location of the leak.

Installation of the dual containment pipe system constructed and arranged in accordance with the invention which provides for access to an installed leak detection system and purging of the annular space is accomplished with a suitable closure piece is shown in FIGS. 9–11. In FIG. 9, a typical manhole configuration 51 with an installed closure piece 52 at the end of each section of an existing conduit 112 is shown. All elements to common elements described in earlier FIGS. are prefaced by 100. In the embodiment illustrated, each closure piece 52 is coupled to a bellow fitting 53 for connection to a service lateral riser tee 54 having a horizontal section 56 and a vertical section 57 which may include a cap 58. A first lateral 59 and a second lateral 61 are connected to vertical section 57 for connection to main conduit 112 now having been lined with the new dual containment system in accordance with the invention. Bellow fitting 53 may be of the standard type filling and includes a solid tubular portion and a flexible or accordion section.

The details of construction of closure piece 52 are shown in the cross-section in FIG. 11. Closure piece 52 includes a tubular section 66 having an open end 67 dimensioned to be inserted into and be bonded to the inside of secondary containment pipe 113 at end 121. Tubular section 66 has a flange 68 at the opposite end for coupling to bellow fitting 53 for making connection to service laterals 59 and 61. An internal locking ring 69 is formed at the end of tubular section 66 adjacent to flange 68 for receiving and engaging the end of a new primary containment pipe 116. The details of how new primary containment pipe 116 is installed within closure piece 52 will be described in more detail below.

Closure piece 52 includes at the twelve o'clock position an internal conduit 71 having an open end 72 at the open end 67 of tubular section 66 and a port 73 on the sidewall. Two internal tube sections 74 and 76 terminating at open internal ends 77 and 78 of closure piece 52 for providing access to the annular space 17 between primary pipe 116 and studded secondary containment pipe 113.

First conduit 74 at the six o'clock position is suitable to receive a leak detection cable for coupling to leak detection indicating station 64 which can be placed out of manhole 51 for conveniently monitoring any leaks in new dual containment pipe system. Alternatively conduit 74 can be visually inspected to determine if the system has formed a leak upstream. Second conduit 76 at the six o'clock position provides access to annular space 117 to purge any moisture or water which condenses in annular space 117 during curing or hardening of new primary containment pipe 116. FIG. 11 shows a side elevation view of flange 68 formed with a plurality of holes 79 for coupling to connections to service laterals and other manhole connections.

Port 73 allows for purging annular space 117. Preferably, the primary purging method applies a vacuum at conduit 74 or 76, (depending on which one is open) to boil-off any condensate in annular space 117 by heat generated by curing a cured in place primary liner, or by heating primary pipe. Port 73 can also be used for purging annular space 117 with dry compressed air and/or nitrogen.

The dual containment pipe system utilizing closure piece 52 constructed and arranged in accordance with the invention is installed as follows. Secondary containment pipe 113 having studs 115 on its inside surface except at end 121 is pulled into existing conduit 112 with end 121 extending into manhole 51. Secondary pipe 113 is then inflated so that it rests against the internal surface of conduit 112. End 121 of secondary pipe 113 is cut at about 6 inches to one foot and closure piece 52 is placed inside end 121 of secondary liner 113. A heat shrink sleeve piece 122 is wrapped around the joint between closure piece 52 and secondary pipe 113 and sealed by a heating the sleeve. Sleeve piece 122 is a cross-linked polyethylene sleeve with an internal heat activated adhesive and provides the heat shrunk coupling between the external surface of closure piece 52 and the exterior of secondary pipe 113. The exact adhesive and coupling method used will depend on the materials selected for secondary pipe 113 and closure piece 52. Closure pipe 52 may be formed of a resin fill glass, a wide range of thermoplastic materials such as polyethylene, polypropylene, polyvinyl chloride, vinyl ester or polyurethane, or any other suitable material, such as an epoxy or polyester.

After the coupling between closure piece 52 and secondary containment pipe 113 is formed, adhesive is applied to the interior surface of closure piece 51 and new primary containment pipe 116 is installed in the conventional manner for the type of liner utilized which is then bonded to liner 116. In the case of a cured in place liner, a resin impregnable material, such as felt, glass fibers or a woven fibrous material tube having an impermeable coating on both surfaces is preferably utilized. Flexible liner 116 is turned inside out and installed and in the usual manner as described in connection with FIG. 4. When liner 116 is cured, a bond forms between closure piece 52 and liner 116 which is secured in place in conduit 112 due to locking ring 69.

When closure piece 52 is bonded to secondary liner 113 and primary liner 116 appropriate resins are selected. Typically these resins are of the same type of polymer as the coating on a cured in place liner or the materials of construction of the closure piece. This selection is made in order to ensure a suitable bond between the various elements of the system and depends on the type of effluent in the system. When installation is complete, air vent 73 and conduit 74 and 76 provide the desired access to annular space 117 between the installed secondary liner 113 and new primary containment pipe 116.

A dual containment pipe system prepared in accordance with the invention provides many advantages. Of primary importance is a substantially uniform annular space which is created in situ during installation. The spacing of the studs assures that any leakage which occurs any where around the circumference of the primary pipe will report to a detection system at the six o'clock position. Accordingly, the dual containment pipe system prepared in accordance with the invention is particularly well-suited for rehabilitation of pipelines utilized to carry environmentally dangerous materials such as a wide variety of chemicals and petroleum materials. Leaks caused by breakage in the pipe system will be readily detected by the leak detection system which extends the full length of the retrofitted conduit.

The dual containment system formed utilizing a secondary liner with inwardly facing non-crushable studs in accordance with the invention makes the system applicable to a wide variety of types and sizes of liners suitable for pipeline rehabilitation. These include the soft and flexible cured in place liners, substantially rigid folded and formed liners, diameter reduction pipe, or any of the other conventional systems for rehabilitation of existing conduits.

The secondary liner utilized in the preferred embodiments of the invention described herein is formed from sheets obtained from A/A Manufacturing Inc. in Medford, Mass. and is identified as a profiled HDPE structured liner. It has been illustrated for purposes of example only, and is not set forth on a limiting sense. An important feature of such a sheet is its preformed knobs and staggered configuration to provide a uniform space between its base sheet and the new primary pipe and allows communication along the annulus between the pipes. The sheet is high density polyethylene, polypropylene, poly vinylidene fluoride, ethyl chloro tetrafluoro ethylene, and the like.

It will thus be seen that the objects set forth above, among those made apparent from the preceding description, are efficiently attained and, since certain changes may be made in carrying out the method and in the pipe set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might said to fall therebetween.

What is claimed is:

1. A closure piece for use in connection with installation of a dual containment pipe system including a secondary containment pipe and a primary containment pipe with a substantially uniform annular space therebetween, in an existing conduit, comprising;
    a tubular section having a first open end dimensioned to fit within a new secondary containment pipe and a second end for coupling to other pipe elements,
    the tubular section formed with at least a first internal conduit having a first opening at the first open end of the tubular section and a port in the sidewall of the tubular section for providing access to the annular space between the primary and secondary containment pipe.

2. The closure piece of claim 1, including a flange formed on the second end of the tubular section.

3. The closure piece of claim 1, wherein the internal conduit is dimensioned to receive a leak detection cable placed in the space between the pipes.

4. The closure piece of claim 1, wherein the first conduit is positioned at the six o'clock position of the closure piece.

5. The closure piece of claim 4, further including a second conduit at the six o'clock position for providing access to the annual space between the secondary containment pipe and the primary containment pipe.

6. The closure piece of claim 4, wherein the tubular section is formed with an auxiliary internal conduit formed along the wall of the tubular section extending from the open end to a position intermediate the sidewall for providing access to the space between the pipes.

7. The closure piece of claim 6, wherein the auxiliary conduit is formed at the twelve o'clock position.

8. The closure piece of claim 1, formed with an internal locking ring for engaging the installed primary containment pipe.

9. A manhole system for connecting service laterals to a main line pipe while maintaining dual containment in at least one dually contained mainline pipe terminating in the manhole, comprising:
    a closure piece coupled to the dually contained mainline pipe terminating in the manhole; and
    a bellow fitting coupled to the closure piece in the manhole;
    the bellow fitting including means for coupling to the closure piece and including a flexible segment for maintaining integrity of the dual containment system in response to movement of any structure.

10. The manhole system of claim 9, wherein the means for coupling the bellow fitting is a flange.

11. The manhole system of claim 9, further including a service lateral riser tee coupled to one end of the bellow fitting;
    the service lateral riser tee including an inlet for coupling to a service lateral emptying into the mainline pipe.

12. The manhole system of claim 11, wherein the service lateral riser tee includes a mainline section having coupling means for coupling to the bellow fitting and includes a riser tee portion having inlets for coupling to the service laterals emptying into the system.

13. The manhole system of claim 9, wherein the system includes two mainline pipes terminating in the manhole, each mainline pipe terminating in a closure piece in the manhole, each closure piece coupled to at least one bellow fitting and a service lateral riser tee disposed between the two bellow fittings with the service laterals coupled to the service lateral riser tee.

* * * * *